United States Patent
Lai et al.

(10) Patent No.: US 9,158,476 B2
(45) Date of Patent: Oct. 13, 2015

(54) METHOD FOR SWITCHING OPERATION MODE, MEMORY CONTROLLER AND MEMORY STORAGE APPARATUS

(71) Applicant: PHISON ELECTRONICS CORP., Miaoli (TW)

(72) Inventors: Ming-Fu Lai, Miaoli (TW); Kiang-Leong Lau, Miaoli (TW); Yung-Chuan Chen, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 293 days.

(21) Appl. No.: 13/749,691

(22) Filed: Jan. 25, 2013

(65) Prior Publication Data
US 2014/0164680 A1    Jun. 12, 2014

(30) Foreign Application Priority Data
Dec. 7, 2012  (TW) .............................. 101146104 A (51) Int. Cl.
*G06F 12/00* (2006.01)
*G06F 3/06* (2006.01)

(52) U.S. Cl.
CPC ............ *G06F 3/0679* (2013.01); *G06F 3/0605* (2013.01); *G06F 3/0634* (2013.01); *G06F 3/0659* (2013.01); *G06F 3/0688* (2013.01)

(58) Field of Classification Search
CPC ... G06F 13/385; G06F 3/0605; G06F 3/0634; G06F 3/0659; G06F 3/0679; G06F 3/0688
See application file for complete search history.

(56) References Cited

U.S. PATENT DOCUMENTS

2007/0136501 A1*   6/2007  Chang et al. .................. 710/105

FOREIGN PATENT DOCUMENTS

| CN | 102707969 | 10/2012 |
| TW | 201133236 | 10/2011 |

OTHER PUBLICATIONS

"Office Action of Taiwan Counterpart Application", issued on Jul. 22, 2015, p. 1-p. 8, in which the listed references were cited.

* cited by examiner

*Primary Examiner* — Cheng-Yuan Tseng
*Assistant Examiner* — Alan Otto
(74) *Attorney, Agent, or Firm* — Jianq Chyun IP Office (57) ABSTRACT

An operation mode switching method for a memory storage apparatus, a memory controller and a memory storage apparatus using the method are provided. The operation mode switching method includes receiving at least one access command from a host system and determining whether the access command conforms to a predetermined pattern. If the access command conforms to the predetermined pattern, an operation mode of the memory storage apparatus is switched from a first mode to a second mode. The access command includes a first write command including a write string, and the memory storage apparatus executes an operation corresponding to the write string. Accordingly, the method switches the operation mode of the storage memory apparatus by determining the pattern of the access command, so as to simplify the procedure of switching the operation mode and effectively decrease the probability of switching the operation mode incorrectly.

23 Claims, 6 Drawing Sheets

METHOD FOR SWITCHING OPERATION MODE, MEMORY CONTROLLER AND MEMORY STORAGE APPARATUS

CROSS-REFERENCE TO RELATED APPLICATION

This application claims the priority benefit of Taiwan application serial no. 101146104, filed on Dec. 7, 2012. The entirety of the above-mentioned patent application is hereby incorporated by reference herein and made a part of this specification.

BACKGROUND

1. Technology Field

The present invention relates to an operation mode switching method for a memory storage apparatus, and a memory controller and the memory storage apparatus using the operation mode switching method.

2. Description of Related Art

The growth of digital cameras, mobile phones, and MP3 players has been rapid in recent years. Consequently, the consumers' demand for storage media has increased tremendously. Light and portable memory cards also gradually become the most commonly used storage media for these electronic products. In light of the multiple functions of the electronic products, various types of memory cards, e.g. Compact Flash (CF) memory cards, Security Disk (SD) memory cards, and Memory Sticks, have been provided conforming to the specifications of the products. Generally speaking, in addition to the data stored by the user, memory cards also contain therein special information related to the memory cards, which can only be accessed with a special command in a special mode.

The most common way to access a memory card is through a card reader with an access function, which allows a host system to write data into or read data from the memory card. As technology advances, a multi card reader has also been developed to correspond to memory cards of different specifications. However, most card readers available in the market can only perform simple access operations, and the host system cannot execute the special command through such card readers nor can access the special information in the memory cards. Therefore, how to switch the operation mode of the memory cards through a general access command to access the special information in the memory cards and meanwhile prevent the operation mode of the memory cards from being switched incorrectly due to wrong judgment has become an important issue in this field.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides an operation mode switching method, a memory controller, and a memory storage apparatus, wherein an operation mode of the memory storage apparatus is switched by determining a pattern of an access command, so as to simplify the switch of the operation mode and reduce the probability of incorrectly switching the operation mode.

An exemplary embodiment of the invention provides an operation mode switching method for a memory storage apparatus. An operation mode of the memory storage apparatus includes a first mode and a second mode. The operation mode switching method includes receiving at least one access command from a host system and determining whether the access command conforms to a predetermined pattern. If the at least one access command conforms to the predetermined pattern, the operation mode of the memory storage apparatus is switched from the first mode to the second mode. Herein, the at least one access command includes a first write command which includes a write string, and the write string instructs the memory storage apparatus to execute an operation corresponding to the write string.

Another exemplary embodiment of the invention provides a memory controller for controlling a memory storage apparatus. An operation mode of the memory storage apparatus includes a first mode and a second mode. The memory controller includes a connection interface, a memory interface, and a memory management circuit. The memory interface is coupled to a rewritable non-volatile memory module, and the memory management circuit is coupled to the connection interface and the memory interface for receiving at least one access command from a host system. The memory management circuit determines whether the at least one access command conforms to a predetermined pattern. If the at least one access command conforms to the predetermined pattern, the memory management circuit switches the operation mode of the memory storage apparatus from the first mode to the second mode. Herein, the at least one access command includes a first write command having a write string, and the memory management circuit executes an operation corresponding to the write string.

Yet another exemplary embodiment of the invention provides a memory storage apparatus which includes a connector, a rewritable non-volatile memory module, a buffer memory, and a memory controller. The memory controller is coupled to the rewritable non-volatile memory module, the connector, and the buffer memory for receiving at least one access command from a host system. The memory controller determines whether the at least one access command conforms to a predetermined pattern. If the at least one access command conforms to the predetermined pattern, the memory controller switches the operation mode of the memory storage apparatus from the first mode to the second mode. Herein, the at least one access command includes a first write command having a write string, and the memory controller executes an operation corresponding to the write string.

Based on the above, the operation mode switching method, the memory controller, and the memory storage apparatus in the exemplary embodiments of the invention determine whether the access command conforms to the predetermined pattern to decide whether to switch the operation mode of the memory storage apparatus, which simplifies the switch of the operation mode and reduces the probability of incorrectly switching the operation mode.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus (i.e. a memory storage system) includes a rewritable non-volatile memory module and a controller (i.e. a control circuit). The memory storage apparatus is usually used together with a host system, such that the host system can write data into or read data from the memory storage apparatus.

Figure 1A:
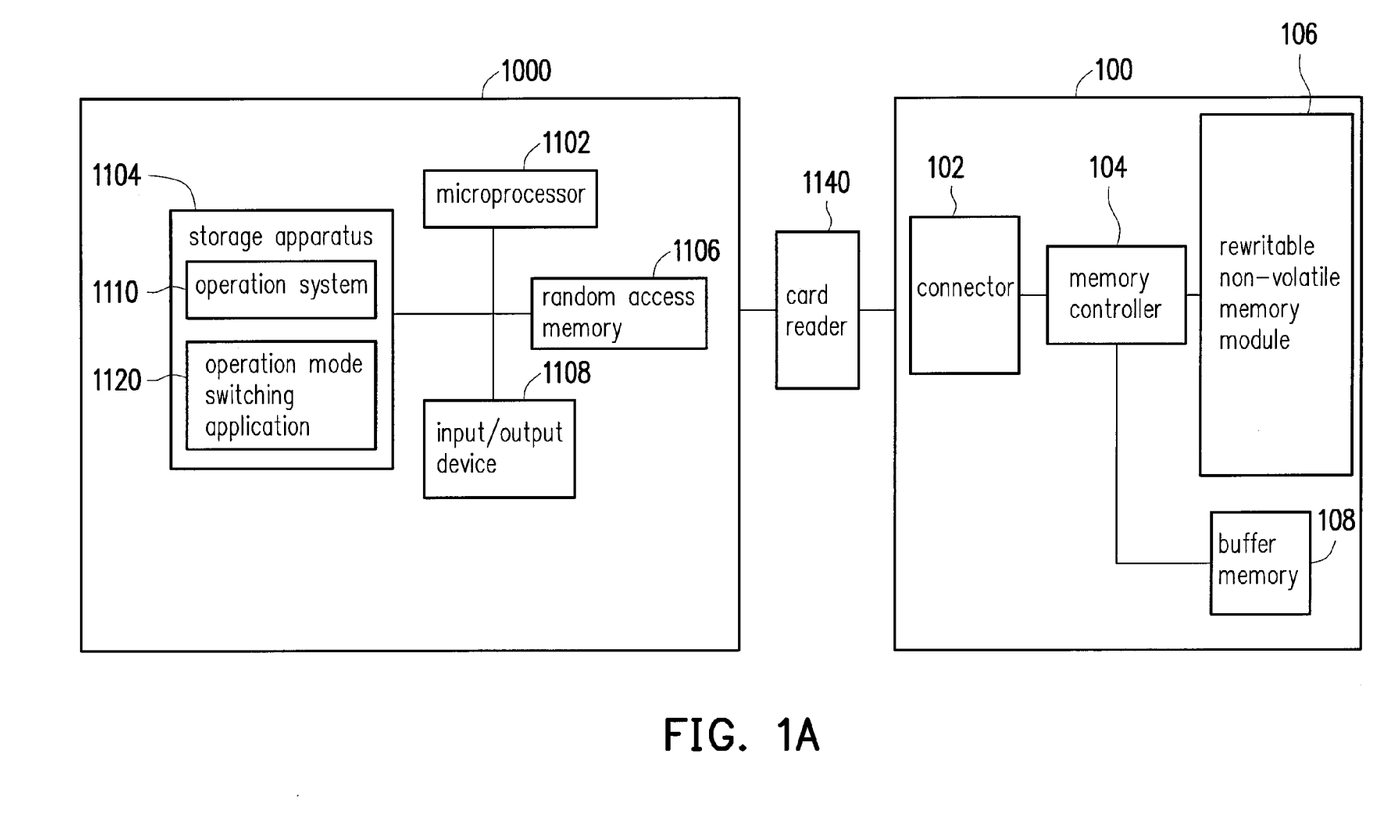
FIG. 1A is a block diagram illustrating a host system and a memory storage apparatus according to an exemplary embodiment of the present invention.

FIG. 1A is a block diagram illustrating a host system and a memory storage apparatus according to an exemplary embodiment of the invention.

Referring to FIG. 1A, a host system 1000 includes a microprocessor 1102, a storage apparatus 1104, a random access memory 1106, and an input/output device 1108. When the host system 1000 is booted, the microprocessor 1102 executes an operation system 1110 installed in the storage apparatus 1104 to enable the host system 1000 to provide a function corresponding to an operation of the user. For example, in this exemplary embodiment, the host system 1000 is a computer system and the operation system 1110 is a window operation system. When the host system 1000 is booted, the user may operate the host system 1000 via the input/output device 1108 to execute functions, such as editing documents/files, editing audio/video files, playing audio/video files, etc.

Figure 1B:
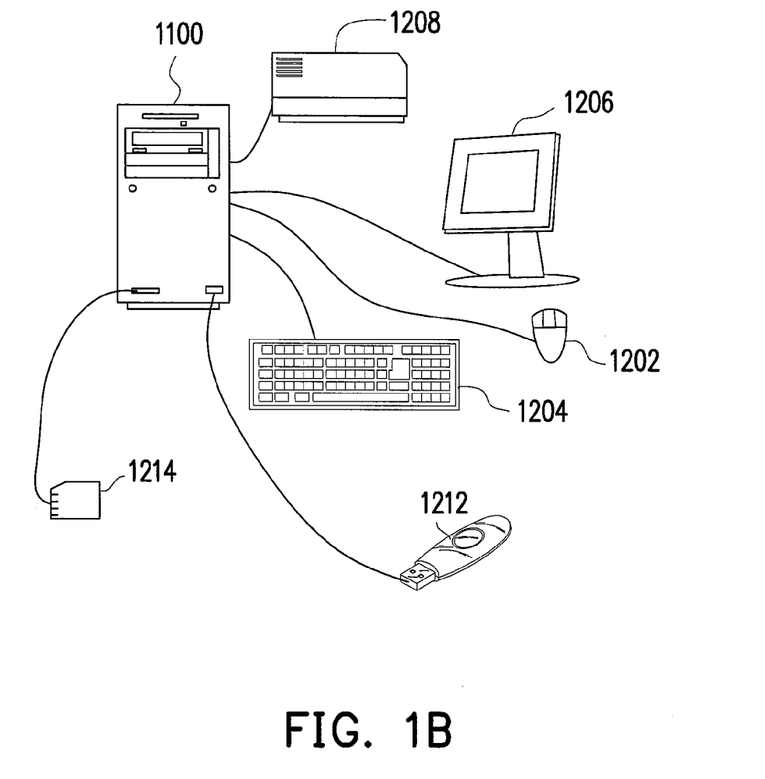
FIG. 1B is a schematic diagram illustrating a computer, an input/output device, and a memory storage apparatus according to the first exemplary embodiment of the present invention.

A memory storage apparatus 100 is coupled to the host system 1000 and writes in or reads data according to a command from the operation system 1110 of the host system 1000. For example, FIG. 1B is a schematic diagram illustrating a computer, the input/output device, and the memory storage apparatus according to the first exemplary embodiment of the present invention, wherein the memory storage apparatus 100 may be a rewritable non-volatile memory storage apparatus, such as a flash disk 1212, a memory card 1214, etc., as shown in FIG. 1B.

Figure 1C:
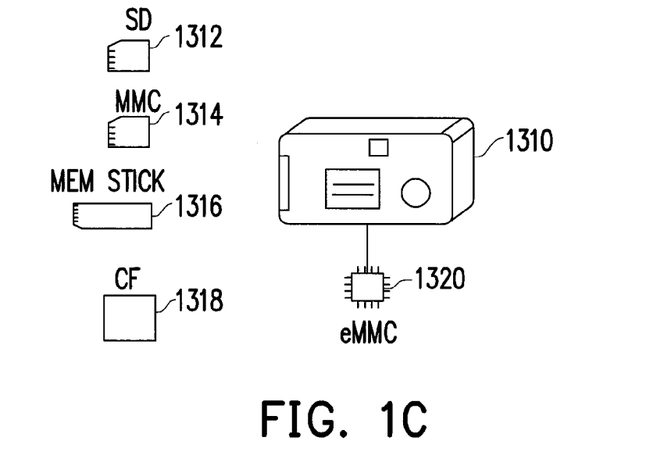
FIG. 1C is a schematic diagram illustrating a host system and a memory storage apparatus according to another exemplary embodiment of the present invention.

Even though the host system 1000 is exemplified as a computer system in this exemplary embodiment, in another exemplary embodiment of the invention, the host system 1000 may be a digital camera, a video camera, a telecommunication device, an audio player, or a video player, etc. For example, in the case that the host system is a digital camera (video camera) 1310, the rewritable non-volatile memory storage apparatus may be an SD (Secure Digital) card 1312, an MMC (Multi Media Card) card 1314, a memory stick 1316, a CF (Compact Flash) card 1318, or an embedded storage apparatus 1320 (as shown in FIG. 1C). The embedded storage apparatus 1320 includes an embedded MMC (eMMC). It should be mentioned that the eMMC is directly coupled to a substrate of the host system.

In this exemplary embodiment, the memory storage apparatus 100 is a memory card coupled to the host system 1000 through a card reader 1140, and the host system 1000 accesses the memory storage apparatus 100 through the card reader 1140. The memory storage apparatus 100 includes a connector 102, a memory controller 104, a rewritable non-volatile memory module 106, and a buffer memory 108.

The connector 102 is compatible to an SD standard. However, it should be noted that the invention is not limited thereto, and the connector 102 may also be a connector compatible to MS standard, MMC standard, CF standard, USB (Universal Serial Bus) standard, or other standards.

The memory controller 104 is coupled to the connector 102, the rewritable non-volatile memory module 106, and the buffer memory 108 for executing a plurality of logical gates, control instructions, or access instructions implemented in a hardware form or in a firmware form, and performing operations, such as data writing, data reading or data erasing in the rewritable non-volatile memory module 106 according to the control commands or access commands of the host system 1000. In particular, the memory controller 104 is capable of executing the operation mode switching method of this exemplary embodiment in response to an operation mode switching actuating signal (i.e., access commands conforming to a predetermined pattern) transmitted by an operation mode switching application 1120 that operates in the host system 1000, thereby switching the operation mode of the memory storage apparatus 100. The operation mode switching method for the memory storage apparatus and detailed steps thereof are described hereinafter with reference to the figures.

The rewritable non-volatile memory module 106 is coupled to the memory controller 104 for storing data written by the host system 1000. In this exemplary embodiment, the rewritable non-volatile memory module 106 is a Multi Level Cell (MLC) NAND flash memory module. However, it should be noted that the invention is not limited thereto. The rewritable non-volatile memory module 106 may be a Single Level Cell (SLC) NAND flash memory module, a Trinary Level Cell (TLC) NAND flash memory module, other flash memory modules, or a memory module having the same characteristics.

The buffer memory 108 is coupled to the memory controller 140 and configured for temporarily storing data and commands from the host system 1000 or data from the rewritable non-volatile memory module 106. In this exemplary embodiment, the buffer memory 108 may be used for temporarily storing system information of the memory storage apparatus 100, details of which are provided hereinafter.

Figure 2:
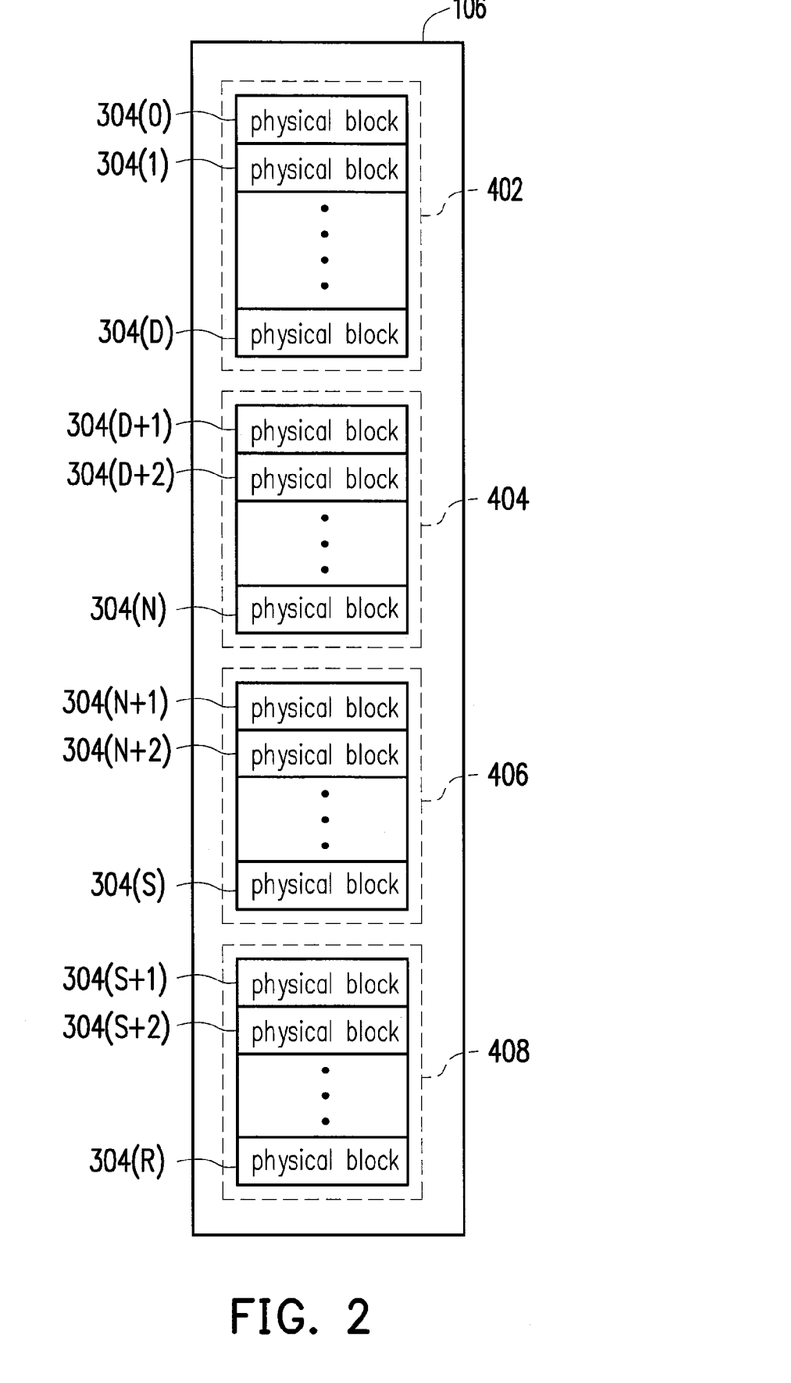
FIG. 2 and FIG. 3 are schematic diagrams illustrating managing physical blocks according to an exemplary embodiment of the present invention.
Figure 3:
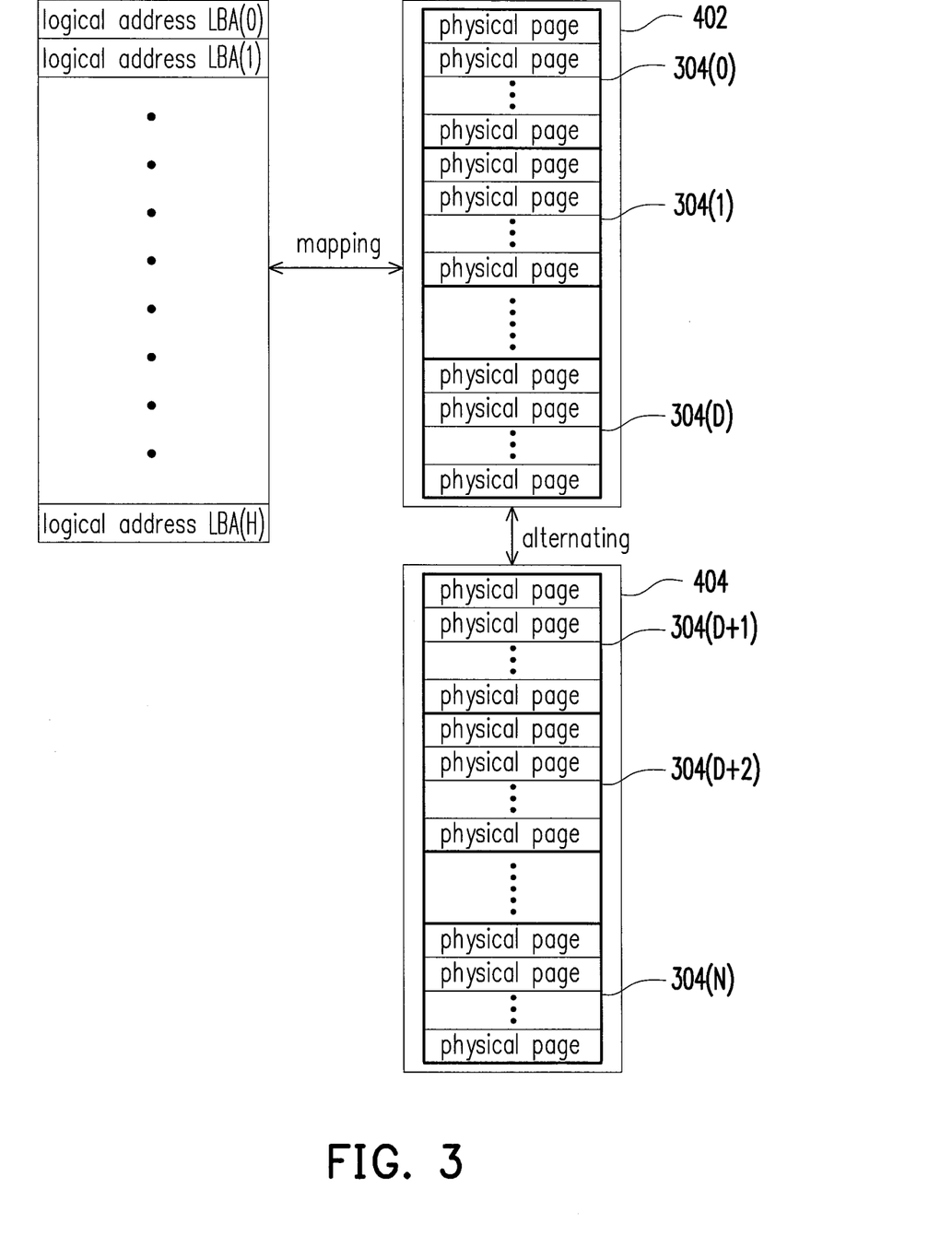

FIG. 2 and FIG. 3 are schematic diagrams illustrating managing physical blocks according to an exemplary embodiment of the invention.

Referring to FIG. 2, the rewritable non-volatile memory module 106 includes a plurality of physical blocks 304(0)-304(R). Each of the physical blocks 304(0)-304(R) has a plurality of physical pages, and the physical pages belonging to the same physical block 304(0)-304(R) may be independently written and be erased simultaneously. To be more specific, the physical block 304(0)-304(R) is the smallest unit for erasing. That is, each of the physical blocks 304(0)-304(R) contains a minimum of memory cells that are erased together. One physical page is the minimum unit for programming. That is, one physical page is the minimum unit for writing data. However, it should be noted that, in another exemplary embodiment of the invention, the minimum unit for writing data may be a sector or other sizes. Generally speaking, the memory controller 104 logically groups the physical blocks 304(0)-304(R) of the rewritable non-volatile memory module 106 into a data area 402, a spare area 404, a replacement area 406, and a hidden area 408, wherein the physical blocks grouped into the data area 402 and the spare area 404 alternately store the data written by the host system 1000, the physical blocks in the replacement area 406 are used for replacing damaged physical blocks in the data area and the spare area, and the hidden area 408 is used for storing system data used by the memory controller 104. In particular, the host system 1000 cannot access the hidden area 408. In other words, the system information of the memory storage apparatus 100 can also be stored here. Under general circumstances, the host system 100 cannot access the hidden area 408 and thus cannot acquire the system information of the memory storage apparatus 100. It should be noted that the system information may be stored elsewhere, which is not restricted to the above.

Referring to FIG. 3, in order to enable the host system 1000 to easily access the physical blocks that alternately store data, the memory controller 104 allocates logical addresses LBA(0)-LBA(H) to map a plurality of physical pages in the physical blocks of the data area 402, such that the host system 1000 can directly write or read data according to the logical addresses LBA(0)-LBA(H). For example, when the memory storage apparatus 100 is formatted, the logical addresses LBA(0)-LBA(H) initially be mapped to the plurality of physical pages in the physical blocks 340(0)-340(D) of the data area 402.

Figure 4:
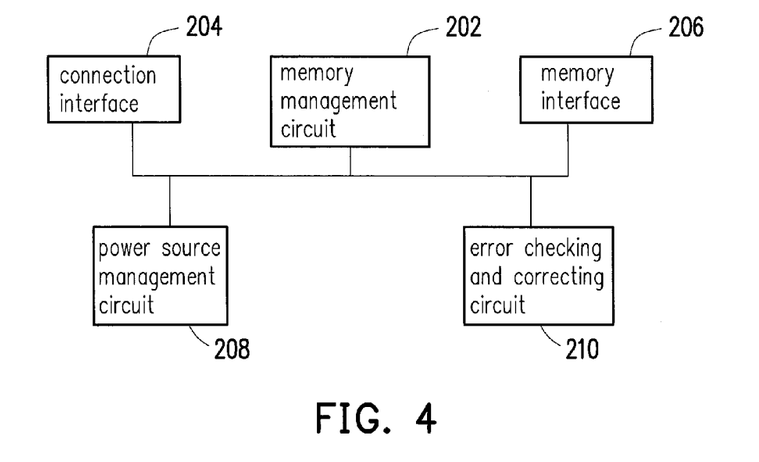
FIG. 4 is a block diagram illustrating a memory controller according to an exemplary embodiment of the present invention.

FIG. 4 is a block diagram illustrating a memory controller according to an exemplary embodiment of the present invention.

Referring to FIG. 4, the memory controller 104 includes a memory management circuit 202, a connection interface 204, a memory interface 206, a power source management circuit 208, and an error checking and correcting circuit 210.

The memory management circuit 202 is configured for controlling the overall operation of the memory controller 104. Specifically, the memory management circuit 202 has a plurality of control instructions. When the memory storage apparatus 100 is powered on, the control instructions are executed to control the overall operation of the memory controller 104. For instance, the memory management circuit 202 executes a memory management mechanism shown in FIG. 2 and FIG. 3. In addition, in this exemplary embodiment, the memory management circuit 202 is also configured for executing the operation mode switching method on the memory storage apparatus 100.

In this exemplary embodiment, the control instructions of the memory management circuit 202 are implemented in a firmware form. For instance, the memory management circuit 202 includes a microprocessor unit (not shown) and a read-only memory (not shown), and the control instructions are burnt into the read-only memory. When the memory storage apparatus 100 is operated, the control instructions are executed by the microprocessor unit.

According to another exemplary embodiment of the present invention, the control instructions of the memory management circuit 202 may be stored in a specific area (e.g. a system area in the memory module exclusively used for storing system data) of the rewritable non-volatile memory module 106 as program codes. Moreover, the memory management circuit 202 includes the microprocessor unit (not shown), the read-only memory (not shown), and a random access memory (not shown). Specifically, the read-only memory has a boot code segment. When the memory controller 104 is enabled, the microprocessor unit first executes the boot code segment to load the control instructions stored in the rewritable non-volatile memory module 106 into the random access memory of the memory management circuit 202. Afterwards, the microprocessor unit executes the control instructions.

Additionally, according to another exemplary embodiment of the invention, the control instructions of the memory management circuit 202 may be implemented in a hardware form. For example, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured for managing a physical erasing unit of the rewritable non-volatile memory module 106; the memory writing circuit is configured for issuing a write command to the rewritable non-volatile memory module 106 to write data into the rewritable non-volatile memory module 106; the memory reading circuit is configured for issuing a read command to the rewritable non-volatile memory module 106 to read data from the rewritable non-volatile memory module 106; the memory erasing circuit is configured for issuing an erase command to the rewritable non-volatile memory module 106 to erase data from the rewritable non-volatile memory module 106; and the data processing circuit is configured for processing the data to be written into the rewritable non-volatile memory module 106 and the data to be read from the rewritable non-volatile memory module 106.

The connection interface 204 is coupled to the memory management circuit 202 and the card reader 1140 and configured for receiving and identifying the commands and data transmitted by the host system 1000. That is, the commands and data transmitted by the host system 1000 are passed to the memory management circuit 202 through the card reader 1140 and then the connection interface 204. In this exemplary embodiment, the connection interface 204 conforms to the SD standard. However, it should be noted that the invention is not limited thereto, and the connection interface 204 may be an interface conforming to MS standard, MMC standard, CF standard, USB standard, or other standards.

The memory interface 206 is coupled to the memory management circuit 202 for accessing the rewritable non-volatile memory module 106. In other words, the data that is to be written into the rewritable non-volatile memory module 106 is converted into a format acceptable to the rewritable non-volatile memory module 106 by the memory interface 206.

The power source management circuit 208 is coupled to the memory management circuit 202 and configured for controlling the power of the memory storage apparatus 100.

The error checking and correcting circuit 210 is coupled to the memory management circuit 202 and configured for executing an error checking and correcting procedure to ensure the accuracy of data. More specifically, when the memory management circuit 202 receives the write command from the host system 1000, the error checking and correcting circuit generates an error checking and correcting (ECC) code for the data corresponding to the write command, and the memory management circuit 202 writes the data corresponding to the write command and the corresponding error checking and correcting code into the rewritable non-volatile memory module 106. Subsequently, when the memory management circuit 202 reads the data from the rewritable non-volatile memory module 106, the error checking and correcting code corresponding to the data is also read by the rewritable non-volatile memory module 106 simultaneously, and the error checking and correcting circuit 210 executes the error checking and correcting procedure on the read data based on the error checking and correcting code.

Specifically, the memory storage apparatus 100 not only provides storage space but also stores special information therein, e.g. the system information of the memory storage apparatus 100. In a general operation mode, the system information of the memory storage apparatus 100 is not accessible to the host system 1000. The system information of the memory storage apparatus 100 can be accessed only when a special command is inputted to actuate a special mode (e.g. Vendor Mode) of the memory storage apparatus 100. Moreover, the memory storage apparatus 100 has a special function that is triggered only in the special mode. However, the card reader 1140 can only identify and execute the access command (e.g. write command and read command) and cannot execute the special command. Based on the above, an exemplary embodiment of the present invention provides an operation mode switching method for switching the operation mode of the memory storage apparatus 100 through the card reader 1140.

Figure 5:
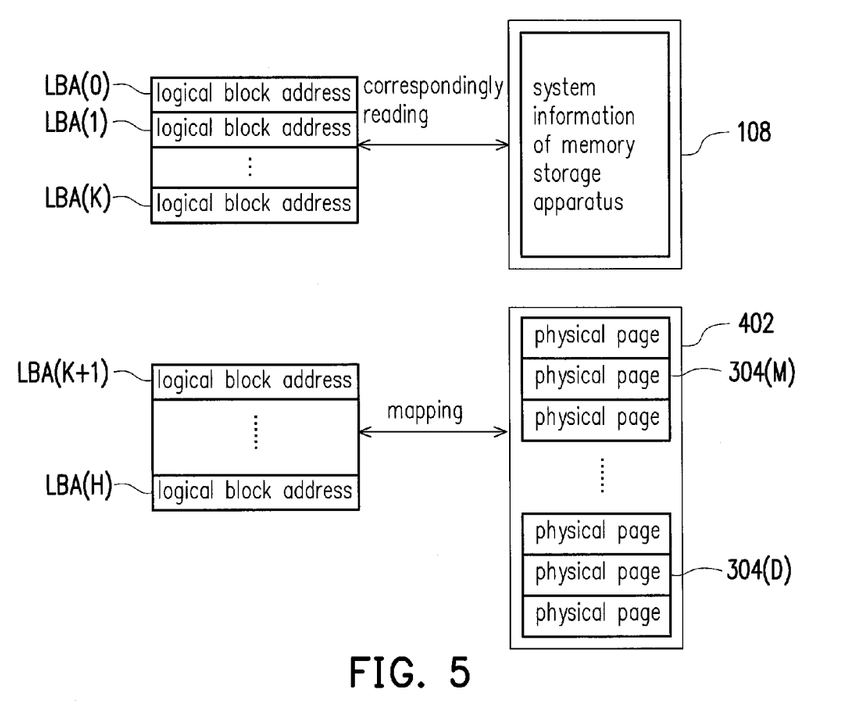
FIG. 5 is a schematic diagram illustrating an operation mode switching method according to an exemplary embodiment of the present invention.

FIG. 5 is a schematic diagram illustrating an operation mode switching method according to an exemplary embodiment of the invention.

Referring to FIG. 5, after the memory controller 104 (or the memory management circuit 202) receives one or more access commands from the host system 1000, the memory controller 104 (or the memory management circuit 202) determines whether the received access commands conform to the predetermined pattern. If the access commands conform to a predetermined pattern, the memory controller 104 (or the memory management circuit 202) switches the operation mode of the memory storage apparatus 100 from a first mode (i.e. the general operation mode) to a second mode (i.e. the vendor mode). Specifically, in the second mode, the memory controller 104 (or the memory management circuit 202) executes a corresponding operation according to the access commands. To be more detailed, the access command includes a first write command including a write string, and according to the write string, the memory controller 104 (or the memory management circuit 202) executes an operation corresponding to the write string. For example, the memory controller 104 (or the memory management circuit 202) acquires at least one piece of system information from the rewritable non-volatile memory module 106 according to the write string indicated by the write command among the access commands from the host, and stores the system information in the buffer memory 108 of the memory storage apparatus 100. Further, for instance, the memory controller 104 (or the memory management circuit 202) continuously performs virtual reading/writing on the rewritable non-volatile memory module 106 according to the write string indicated by one write command among the access commands from the host, so as to occupy a bandwidth of the connection interface 204, thereby giving the memory storage apparatus 100 sufficient time to execute a background operation. It is noted that the operations executed by the memory storage apparatus 100 are not limited to the above.

Identifying the received access commands according to the predetermined pattern is to reduce the probability of incorrectly switching into the second mode by the host system 1000. Since the operation mode switching method of this exemplary embodiment utilizes the general access command to trigger the mode switching procedure, it is required to design the predetermined pattern to raise the difficulty for triggering the mode switching.

For example, in an exemplary embodiment of the present invention, the access commands include a plurality of first read commands. When the memory controller 104 (or the memory management circuit 202) determines whether the access commands conform to the predetermined pattern, the memory controller 104 (or the memory management circuit 202) first determines whether the first read commands conform to a predetermined read pattern. If the first read commands conform to the predetermined read pattern, the memory controller 104 (or the memory management circuit 202) then determines whether the write string indicated by the first write command conforms to one of a plurality of predetermined command patterns. When the memory controller 104 (or the memory management circuit 202) confirms that the write string of the first write command conforms to one of the predetermined command patterns, the memory controller 104 (or the memory management circuit 202) identifies the access commands as conforming to the predetermined pattern and switches the operation mode of the memory storage apparatus 100 from the first mode to the second mode.

In detail, the predetermined read pattern may have different forms, which should not be limited to the above disclosure of the invention. For example, as shown in FIG. 3, the memory storage apparatus 100 usually includes a plurality of logical addresses LBA(0)-LBA(H) that are mapped to the physical pages of the rewritable non-volatile memory module 106. If the multiple read commands that the memory controller 104 (or the memory management circuit 202) continuously receives from the host system 1000 all instruct to read one logical address (e.g. the first logical address) of the logical addresses LBA(0)-LBA(H), the memory controller 104 (or the memory management circuit 202) identifies the first read commands as conforming to the predetermined read pattern. For example, when receiving ten first read commands that instruct to read the first logical address, the memory management circuit 202 identifies the first read commands as conforming to the predetermined read pattern.

It should be noted that the aforementioned rule to identify the read commands as conforming to the predetermined read pattern when continuously receiving the read commands instructing to read the same logical address is merely one example. In another exemplary embodiment of the invention, the memory controller 104 (or the memory management circuit 202) may determine that the received read commands conform to the predetermined read pattern when identifying that the received commands instruct to read a portion of the logical addresses among the logical addresses LBA(0)-LBA (H) according to a predetermined order. For example, if multiple read commands instruct to continuously read in a reverse order from the logical address LBA(H) to the logical address LBA(H-10), the memory controller 104 (or the memory management circuit 202) identifies that the received read commands conform to the predetermined read pattern. It is noted that the setting of the predetermined order is not limited to the above.

After the memory controller 104 (or the memory management circuit 202) determines that the received first read commands conform to the predetermined read pattern, the memory controller 104 (or the memory management circuit 202) then determines whether the write string of the first write command conforms to the predetermined command pattern. Here, the predetermined command pattern is a special command form used by the memory storage apparatus 100 in the second mode. In other words, the memory controller 104 (or the memory management circuit 202) confirms whether the host system 1000 intends to switch the operation mode of the memory storage apparatus 100 into the second mode according to the first write command transmitted from the host system 1000. If the memory controller 104 (or the memory management circuit 202) determines that the write string indicated by the first write command does not conform to the predetermined command pattern, it means that the conformity of the received read commands and the predetermined read pattern may be a coincidence, and the host system 1000 does not intend to switch the operation mode of the memory storage apparatus 100. Therefore, the memory controller 104 (or the memory management circuit 202) writes the write string into the corresponding physical page according to the logical address indicated by the first write command in the first mode. On the contrary, if the memory management circuit 202 determines that the write string indicated by the first write command conforms to the predetermined command pattern, the memory controller 104 (or the memory management circuit 202) switches the operation mode of the memory storage apparatus from the first mode to the second mode.

Further referring to FIG. 5, in the second mode, the memory controller 104 (or the memory management circuit 202) executes the corresponding operation according to the write string of the first write command. Details are provided below. In an embodiment of the present invention, the memory controller 104 (or the memory management circuit 202) acquires the system information of the memory storage apparatus 100 from the rewritable non-volatile memory module 106 according to the write string indicated by the first write command and stores the system information of the memory storage apparatus 100 in the buffer memory 108 of the memory storage apparatus 100. In addition, the memory controller 104 (or the memory management circuit 202) identifies a portion of the logical addresses LBA(0)-LBA(K) as corresponding to the system information of the memory storage apparatus 100. In other words, the logical addresses LBA(0)-LBA(K) are predetermined logical addresses in the second mode. The host system 1000 may read the system information of the memory storage apparatus 100 in the second mode by giving the read commands to read the predetermined logical addresses (e.g. LBA(K)).

For example, in the second mode, the memory controller 104 (or the memory management circuit 202) receives a second read command from the host system 1000 and determines whether the logical address indicated by the second read command is the predetermined logical address. In the case the logical address indicated by the second read command is the predetermined logical address, the memory controller 104 (or the memory management circuit 202) extracts the corresponding system information from the buffer memory 108 and transmits the same to the host system 1000. On the contrary, if the logical address indicated by the second read command are not the predetermined logical addresses, the memory controller 104 (or the memory management circuit 202) switches the operation mode of the memory storage apparatus 100 from the second mode back to the first mode and executes the second read command in the first mode, so as to transmit the data in the rewritable non-volatile memory module 106 to the host system 1000. It should be noted that the system information of the memory storage apparatus 100 is not necessarily stored in the buffer memory 108 of the memory storage apparatus 100. The memory controller 104 (or the memory management circuit 202) may wait until receiving the read command given by the host system 1000 to read the system information of the memory storage apparatus 100.

Moreover, the host system 1000 may use the write command to modify the system information of the memory storage apparatus 100 or further use the access command to trigger a special function built in the memory storage apparatus 100. That is, the host system 1000 gives the access command and the memory controller 104 (or the memory management circuit 202) executes the operation corresponding to the write string of the first write command of the access command for the memory storage apparatus 100 to operate according to different access commands in the second mode.

In this exemplary embodiment, after the host system 1000 completes accessing the system information, the memory controller 104 (or the memory management circuit 202) switches the operation mode of the memory storage apparatus 100 from the second mode back to the first mode.

In this exemplary embodiment, the operation mode of the memory storage apparatus 100 is switched from the second mode to the first mode after the memory management circuit 202 transmits the system information to the host system 1000. However, the present invention is not limited thereto. In another exemplary embodiment, the memory controller 104 (or the memory management circuit 202) may, during the second mode, receive the second write command and determine whether the write string of the second write command conforms to a command pattern for closing the second mode. If the write string of the second write command conforms to the command pattern for closing the second mode, the memory controller 104 (or the memory management circuit 202) switches the operation mode of the memory storage apparatus 100 from the second mode to the first mode.

Figure 6:
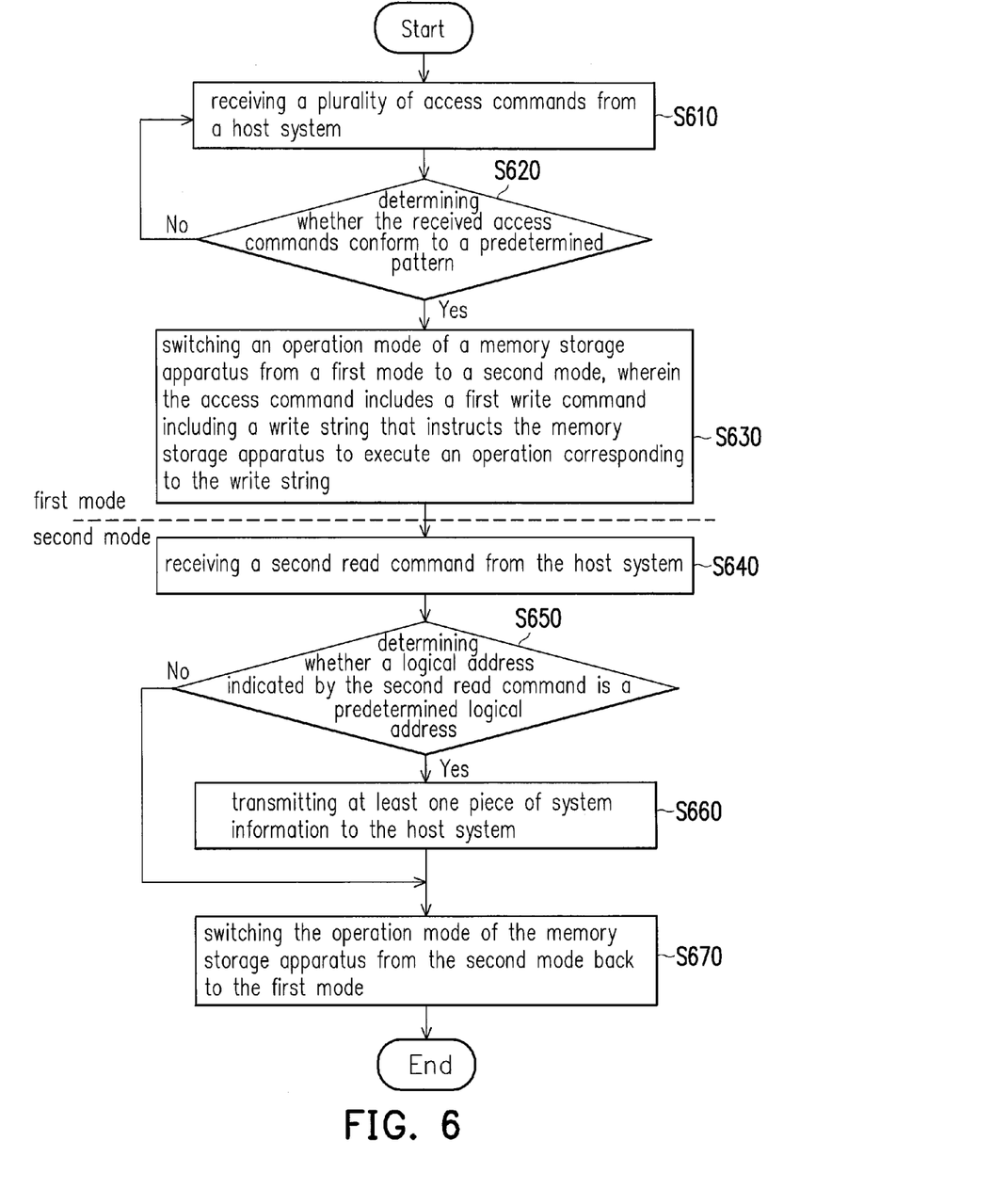
FIG. 6 is a flowchart of a mode switching method according to an exemplary embodiment of the present invention.

FIG. 6 is a flowchart of a mode switching method according to an exemplary embodiment of the present invention.

Referring to FIG. 6, in Step S610, a plurality of access commands are received from the host system 1000. Then, in Step S620, it is determined whether the received access commands conform to the predetermined pattern. If the received access commands conform to the predetermined pattern, then the operation mode of the memory storage apparatus 100 is switched from the first mode to the second mode in Step S630. The access commands include a first write command, which includes a write string instructing the memory storage apparatus 100 to execute an operation corresponding to the write string.

For example, in Step S630, the memory controller 104 (or the memory management circuit 202) acquires at least one piece of system information from the rewritable non-volatile memory module 106 according to the write string indicated by the first write command and stores the system information in the buffer memory 108 of the memory storage apparatus 100. After Step S630, the memory storage apparatus 100 is in the second mode.

If the received access commands do not conform to the predetermined pattern, the procedure goes back to Step S610 to receive the access commands again and determine whether the latter access commands conform to the predetermined pattern.

Next, in Step S640, the host system receives a second read command during the second mode. Thereafter, in Step S650, it is determined whether the logical address indicated by the second read command is the predetermined logical address. If the logical address indicated by the second read command is the predetermined logical address, at least one piece of system information is transmitted to the host system 1000 in Step S660. After the at least one piece of system information is transmitted to the host system 1000, the operation mode of the memory storage apparatus 100 is switched from the second mode back to the first mode in Step S670.

It should be noted that, if the second write command is received during the second mode and the write string indicated by the second write command conforms to the command pattern for closing the second mode, the operation mode of the memory storage apparatus 100 is switched from the second mode back to the first mode.

In conclusion of the above, according to the embodiments of the invention, the operation mode switching method, and the memory controller and the memory storage apparatus that use the operation mode switching method determine whether the access commands conform to the predetermined pattern, so as to decide whether to switch the operation mode of the memory storage apparatus from the first mode to the second mode, such that the operation mode of the memory storage apparatus connected to the host system through the card reader can be switched according to the instruction of the host system. Moreover, through the mechanism disclosed in the exemplary embodiments, the probability of incorrectly switching the operation mode to the second mode is significantly reduced. The previously described exemplary embodiments of the present invention have the advantages aforementioned, wherein the advantages aforementioned not required in all versions of the invention.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An operation mode switching method for a memory storage apparatus, an operation mode of the memory storage apparatus comprising a first mode and a second mode, the operation mode switching method comprising:
   receiving at least one access command from a host system;
   determining whether the at least one access command conforms to a predetermined pattern; and
   switching the operation mode of the memory storage apparatus from the first mode to the second mode if the at least one access command conforms to the predetermined pattern, wherein the at least one access command comprises a first write command and a plurality of first read commands, the first write command comprises a write string, and
   wherein the write string instructs the memory storage apparatus to execute an operation corresponding to the write string,
   wherein the step of determining whether the at least one access command conforms to the predetermined pattern comprises:
      determining whether the first read commands conform to a predetermined read pattern;
      determining whether the write string indicated by the first write command conforms to one of a plurality of predetermined command patterns if the first read commands conform to the predetermined read pattern; and
      identifying the at least one access command as conforming to the predetermined pattern if the write string indicated by the first write command conforms to one of the predetermined command patterns.

2. The operation mode switching method according to claim 1, wherein the memory storage apparatus is a memory card, and
   wherein the step of receiving the at least one access command from the host system comprises receiving the at least one access command from the host system through a card reader.

3. The operation mode switching method according to claim 1, wherein the memory storage apparatus comprises a rewritable non-volatile memory module, and a plurality of logical addresses are configured to map to a plurality of physical pages of the rewritable non-volatile memory module, and
   wherein the step of determining whether the first read commands conform to the predetermined read pattern comprises:
      determining whether the first read commands instruct to continuously read a first logical address of the logical addresses; and
      identifying the first read commands as conforming to the predetermined read pattern if the first read commands instruct to continuously read the first logical address of the logical addresses.

4. The operation mode switching method according to claim 1, wherein the memory storage apparatus comprises a rewritable non-volatile memory module, and a plurality of logical addresses are configured to map to a plurality of physical pages of the rewritable non-volatile memory module, and
   wherein the step of determining whether the first read commands conform to the predetermined read pattern comprises:
      determining whether the first read commands instruct to read at least a portion of the logical addresses according to a predetermined order; and
      identifying the first read commands as conforming to the predetermined read pattern if the first read commands instruct to read the at least a portion of the logical addresses according to the predetermined order.

5. The operation mode switching method according to claim 1, further comprising:
   writing the write string into the corresponding physical page according to the logical address indicated by the first write command in the first mode if the write string indicated by the first write command does not conform to the predetermined command pattern.

6. The operation mode switching method according to claim 1, comprising:
receiving a second read command from the host system during the second mode;
determining whether the logical address indicated by the second read command is a predetermined logical address; and
transmitting at least one piece of system information to the host system if the logical address indicated by the second read command is the predetermined logical address.

7. The operation mode switching method according to claim 6, further comprising:
switching the operation mode of the memory storage apparatus from the second mode to the first mode after the at least one piece of system information is transmitted to the host system.

8. The operation mode switching method according to claim 1, comprising:
acquiring at least one piece of system information from the memory storage apparatus according to the write string indicated by the first write command and storing the at least one piece of system information in a buffer memory of the memory storage apparatus.

9. The operation mode switching method according to claim 1, comprising:
receiving a second write command during the second mode;
determining whether a write string indicated by the second write command conforms to a command pattern for closing the second mode among the predetermined command patterns; and
switching the operation mode of the memory storage apparatus from the second mode to the first mode if the write string indicated by the second write command conforms to the command pattern for closing the second mode.

10. A memory controller for controlling a memory storage apparatus, an operation mode of the memory storage apparatus comprising a first mode and a second mode, the memory controller comprising:
a connection interface;
a memory interface coupled to a rewritable non-volatile memory module; and
a memory management circuit coupled to the connection interface and the memory interface, wherein the memory management circuit is configured to receive at least one access command from a host system,
wherein the memory management circuit determines whether the at least one access command conforms to a predetermined pattern, and
wherein the memory management circuit switches the operation mode of the memory storage apparatus from the first mode to the second mode if the at least one access command conforms to the predetermined pattern,
wherein the at least one access command comprises a first write command comprising a write string and a plurality of first read commands, and according to the write string, the memory management circuit executes an operation corresponding to the write string,
wherein, in said operation of determining whether the at least one access command conforms to the predetermined pattern, the memory management circuit determines whether the first read commands conform to a predetermined read pattern;
wherein the memory management circuit determines whether the write string indicated by the first write command conforms to one of a plurality of predetermined command patterns if the first read commands conform to the predetermined read pattern, and
the memory management circuit identifies the at least one access command as conforming to the predetermined pattern if the write string indicated by the first write command conforms to one of the predetermined command patterns.

11. The memory controller according to claim 10, wherein the memory storage apparatus is a memory card and the memory management circuit receives the at least one access command from the host system through a card reader.

12. The memory controller according to claim 10, wherein the memory storage apparatus comprises the rewritable non-volatile memory module, and a plurality of logical addresses are configured to map to a plurality of physical pages of the rewritable non-volatile memory module, and
wherein, in said operation of determining whether the first read commands conform to the predetermined read pattern, the memory management circuit determines whether the first read commands instruct to continuously read a first logical address of the logical addresses, and
the memory management circuit identifies the first read commands as conforming to the predetermined read pattern if the first read commands instruct to continuously read the first logical address of the logical addresses.

13. The memory controller according to claim 10, wherein the memory storage apparatus comprises the rewritable non-volatile memory module, and a plurality of logical addresses are configured to map to a plurality of physical pages of the rewritable non-volatile memory module, and
wherein, in said operation of determining whether the first read commands conform to the predetermined read pattern, the memory management circuit determines whether the first read commands instruct to read at least a portion of the logical addresses according to a predetermined order, and
the memory management circuit identifies the first read commands as conforming to the predetermined read pattern if the first read commands instruct to read the at least a portion of the logical addresses according to the predetermined order.

14. The memory controller according to claim 10, wherein the memory management circuit further writes the write string into the corresponding physical page according to the logical address indicated by the first write command in the first mode if the write string indicated by the first write command does not conform to the predetermined command pattern.

15. The memory controller according to claim 10, wherein the memory management circuit further receives a second read command from the host system and determines whether the logical address indicated by the second read command conforms to a predetermined logical address during the second mode,
and the memory management circuit transmits at least one piece of system information to the host system if the logical address indicated by the second read command is the predetermined logical address.

16. The memory controller according to claim 15, wherein the memory management circuit switches the operation mode of the memory storage apparatus from the second mode to the first mode after the at least one piece of system information is transmitted to the host system.

17. The memory controller according to claim 10, wherein the memory management circuit acquires at least one piece of system information from the rewritable non-volatile memory module according to the write string indicated by the first write command and stores the at least one piece of system information in a buffer memory of the memory storage apparatus.

18. The memory controller according to claim 10, wherein the memory management circuit receives a second write command and determines whether a write string indicated by the second write command conforms to a command pattern for closing the second mode among the predetermined command patterns during the second mode, and the memory management circuit switches the operation mode of the memory storage apparatus from the second mode to the first mode if the write string indicated by the second write command conforms to the command pattern for closing the second mode.

19. A memory storage apparatus, comprising:
a connector;
a rewritable non-volatile memory module;
a buffer memory; and
a memory controller coupled to the rewritable non-volatile memory module, the connector, and the buffer memory, wherein the memory controller is configured to receive at least one access command from a host system,
wherein the memory controller determines whether the at least one access command conforms to a predetermined pattern, and
wherein the memory controller switches an operation mode of the memory storage apparatus from a first mode to a second mode if the at least one access command conforms to the predetermined pattern, and the at least one access command comprises a first write command comprising a write string and a plurality of first read commands, and according to the write string, the memory controller executes an operation corresponding to the write string,
wherein, in said operation of determining whether the at least one access command conforms to the predetermined pattern, the memory controller determines whether the first read commands conform to a predetermined read pattern;

wherein the memory controller determines whether the write string indicated by the first write command conforms to one of a plurality of predetermined command patterns if the first read commands conform to the predetermined read pattern, and
the memory controller identifies the at least one access command as conforming to the predetermined pattern if the write string indicated by the first write command conforms to one of the predetermined command patterns.

20. The memory storage apparatus according to claim 19, wherein the connector is coupled to a card reader of the host system and the memory controller receives the at least one access command from the host system through the card reader.

21. The memory storage apparatus according to claim 19, wherein the memory controller configures a plurality of logical addresses for mapping a plurality of physical pages of the rewritable non-volatile memory module, and
wherein, in said operation of determining whether the first read commands conform to the predetermined read pattern, the memory controller determines whether the first read commands instruct to continuously read a first logical address of the logical addresses, and
the memory controller identifies the first read commands as conforming to the predetermined read pattern if the first read commands instruct to continuously read the first logical address of the logical addresses.

22. The memory storage apparatus according to claim 19, wherein the memory controller further receives a second read command from the host system and determines whether the logical address indicated by the second read command is a predetermined logical address during the second mode, and
the memory controller transmits at least one piece of system information to the host system if the logical address indicated by the second read command is the predetermined logical address.

23. The memory storage apparatus according to claim 19, wherein the memory controller acquires at least one piece of system information from the rewritable non-volatile memory module according to the write string indicated by the first write command and stores the at least one piece of system information in the buffer memory of the memory storage apparatus.

* * * * *